US012608210B2

(12) United States Patent
Xiao

(10) Patent No.: US 12,608,210 B2
(45) Date of Patent: Apr. 21, 2026

(54) INSTRUCTION DISPATCHING METHOD AND APPARATUS FOR MULTITHREADED PROCESSOR, AND STORAGE MEDIUM

(71) Applicant: HYGON INFORMATION TECHNOLOGY CO. , LTD., Tianjin (CN)

(72) Inventor: Hao Xiao, Tianjin (CN)

(73) Assignee: Hygon Information Technology Co., Ltd., Tianjin (CN)

( * ) Notice: Subject to any disclaimer, the term of this patent is extended or adjusted under 35 U.S.C. 154(b) by 194 days.

(21) Appl. No.: 18/690,352

(22) PCT Filed: Aug. 25, 2023

(86) PCT No.: PCT/CN2023/114840
§ 371 (c)(1),
(2) Date: Mar. 8, 2024

(87) PCT Pub. No.: WO2024/041625
PCT Pub. Date: Feb. 29, 2024

(65) Prior Publication Data
US 2024/0411561 A1      Dec. 12, 2024

(30) Foreign Application Priority Data
Aug. 26, 2022    (CN) .......................... 202211033483.6

(51) Int. Cl.
*G06F 9/38*              (2018.01)
(52) U.S. Cl.
CPC .......... *G06F 9/3851* (2013.01); *G06F 9/3877* (2013.01)

(58) Field of Classification Search
CPC .... G06F 9/3851; G06F 9/3877; G06F 9/3836; G06F 9/5038; G06F 2209/5018; Y02D 10/00
See application file for complete search history.

(56) References Cited

U.S. PATENT DOCUMENTS 5,884,058 A * 3/1999 Narayan ............. G06F 9/30152
712/217
7,007,153 B1 * 2/2006 Berenbaum ............... G06F 9/38
718/107
(Continued)

FOREIGN PATENT DOCUMENTS

CN          110647357 A      1/2020
CN          112672440 A      4/2021
(Continued)

*Primary Examiner* — Farley Abad
(74) *Attorney, Agent, or Firm* — Fox Rothschild LLP

(57) ABSTRACT
An instruction dispatching method and apparatus for a multithreaded processor, and a storage medium are provided. The instruction dispatching method includes: receiving a plurality of thread instruction dispatching requests sent by a plurality of decoded instruction queues of the multithreaded processor, respectively, each of the plurality of thread instruction dispatching requests including a plurality of instructions needing to be transmitted to execution waiting queues of corresponding types, respectively; determining whether the plurality of thread instruction dispatching requests have congestion and conflict with respect to a plurality of execution waiting queues of the multithreaded processor; and selecting and responding to one thread instruction dispatching request from the plurality of thread instruction dispatching requests based on the determining.

20 Claims, 8 Drawing Sheets

10

| Receiving a plurality of thread instruction dispatching requests sent by a plurality of decoded instruction queues of the multithreaded processor, respectively, each of the plurality of thread instruction dispatching requests including a plurality of instructions needing to be transmitted to execution waiting queues of corresponding types, respectively | S101 |

| Determining whether the plurality of thread instruction dispatching requests have congestion and conflict with respect to a plurality of execution waiting queues of the multithreaded processor | S102 |

| Selecting and responding to one thread instruction dispatching request from the plurality of thread instruction dispatching requests based on the determining | S103 |

(56) References Cited

U.S. PATENT DOCUMENTS

| | | | | |
|---|---|---|---|---|
| 7,035,998 | B1 * | 4/2006 | Nemirovsky | G06F 9/3836 |
| | | | | 712/215 |
| 8,037,250 | B1 * | 10/2011 | Barreh | G06F 12/0842 |
| | | | | 711/125 |
| 2003/0202525 | A1 * | 10/2003 | Nagatomo | H04L 49/9036 |
| | | | | 370/411 |
| 2006/0059487 | A1 * | 3/2006 | Chatterjee | G06F 9/4881 |
| | | | | 718/100 |
| 2006/0184768 | A1 * | 8/2006 | Bishop | G06F 9/3853 |
| | | | | 712/215 |
| 2010/0241811 | A1 * | 9/2010 | Solihin | G06F 12/0862 |
| | | | | 712/E9.047 |
| 2019/0108032 | A1 | 4/2019 | Gonzalez et al. | |
| 2023/0376476 | A1 * | 11/2023 | Bhola | G06F 16/2246 |

FOREIGN PATENT DOCUMENTS

| | | | |
|---|---|---|---|
| CN | 112789593 | A | 5/2021 |
| CN | 115408153 | A | 11/2022 |
| EP | 3416048 | A2 | 12/2018 |
| WO | 2021217300 | A1 | 11/2021 |

* cited by examiner

<u>10</u>

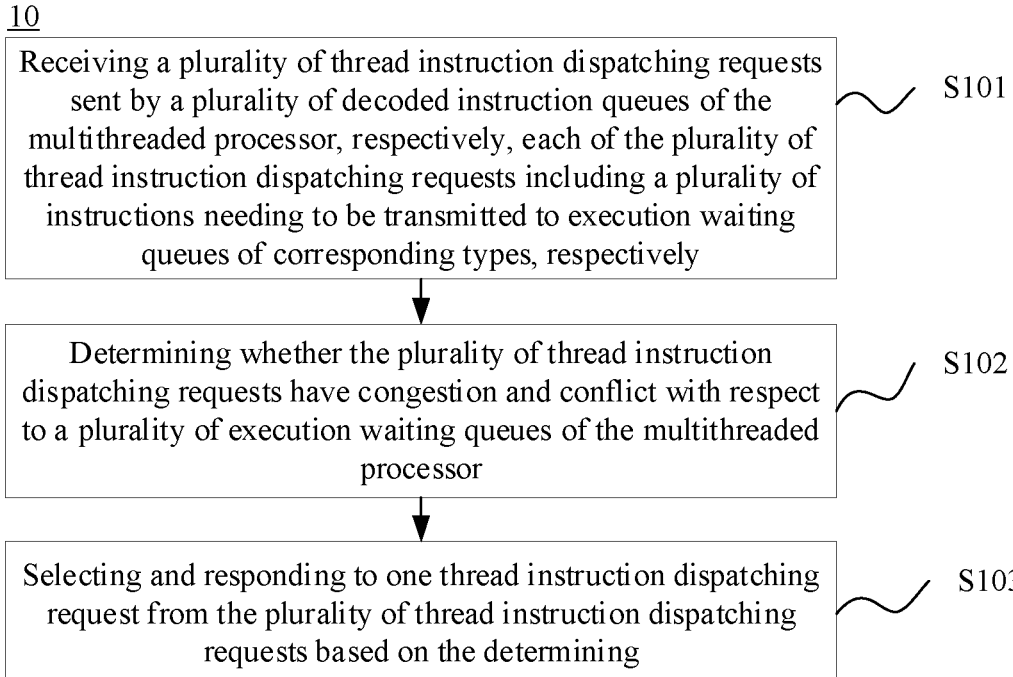

Receiving a plurality of thread instruction dispatching requests sent by a plurality of decoded instruction queues of the multithreaded processor, respectively, each of the plurality of thread instruction dispatching requests including a plurality of instructions needing to be transmitted to execution waiting queues of corresponding types, respectively    S101

Determining whether the plurality of thread instruction dispatching requests have congestion and conflict with respect to a plurality of execution waiting queues of the multithreaded processor    S102

Selecting and responding to one thread instruction dispatching request from the plurality of thread instruction dispatching requests based on the determining    S103

INSTRUCTION DISPATCHING METHOD AND APPARATUS FOR MULTITHREADED PROCESSOR, AND STORAGE MEDIUM

CROSS-REFERENCE TO RELATED APPLICATION

The present application claims priority to International Patent Application No. PCT/CN2023/114840 filed Aug. 25, 2023, which claims priority to Chinese Patent Application No. 202211033483.6 filed on Aug. 26, 2022, the disclosures of which are incorporated herein by reference in their entirety as part of the present application.

TECHNICAL FIELD

Embodiments of the present disclosure relate to an instruction dispatching method for a multithreaded processor, an instruction dispatching apparatus, a data processing apparatus, a processor, an electronic device, and a non-transient readable storage medium.

BACKGROUND

Simultaneous multithreading (SMT) is a hardware multithreading technique that permits execution of instructions from a plurality of threads within a clock cycle of a central processing unit (CPU). In essence, SMT is a method that transforms thread-level parallelism (a plurality of CPUs) into instruction-level parallelism (a same CPU). SMT refers to a capability of a single physical processor dispatching instructions simultaneously in the context of a plurality of hardware threads. SMT is used to create performance advantages in commercial environments and for workloads with high cycle/instruction counts. A processor with a superscalar architecture is suitable for reading and running instructions in parallel. SMT permits simultaneous scheduling and running of two applications on the same processor, thereby utilizing the superscalar architecture properties of the processor.

SUMMARY

At least one embodiment of the present disclosure provides an instruction dispatching method for a multithreaded processor. The instruction dispatching method includes: receiving a plurality of thread instruction dispatching requests sent by a plurality of decoded instruction queues of the multithreaded processor, respectively; determining whether the plurality of thread instruction dispatching requests have congestion and conflict with respect to a plurality of execution waiting queues of the multithreaded processor; and selecting and responding to one thread instruction dispatching request from the plurality of thread instruction dispatching requests based on the determining. Each of the plurality of thread instruction dispatching requests comprises a plurality of instructions needing to be transmitted to execution waiting queues of corresponding types, respectively.

For example, in a method provided in at least one embodiment of the present disclosure, determining whether the plurality of thread instruction dispatching requests have congestion and conflict with respect to the plurality of execution waiting queues of the multithreaded processor includes: determining whether the plurality of thread instruction dispatching requests have congestion and conflict with respect to the plurality of execution waiting queues based on a number of tokens currently available for each of the plurality of execution waiting queues.

For example, in a method provided in at least one embodiment of the present disclosure, determining whether the plurality of thread instruction dispatching requests have congestion with respect to the plurality of execution waiting queues based on the number of tokens currently available for each of the plurality of execution waiting queues includes: in response to a number of tokens in a first execution waiting queue of the plurality of execution waiting queues required by a first thread instruction dispatching request of the plurality of thread instruction dispatching requests being greater than a number of tokens currently available in the first execution waiting queue, determining that the first thread instruction dispatching request has congestion with respect to the first execution waiting queue.

For example, in a method provided in at least one embodiment of the present disclosure, the plurality of execution waiting queues include at least one shared execution waiting queue shared by a plurality of threads. Determining whether the plurality of thread instruction dispatching requests have conflict with respect to the plurality of execution waiting queues based on the number of tokens currently available for each of the plurality of execution waiting queues includes: in response to a second thread instruction dispatching request of the plurality of thread instruction dispatching requests having congestion with respect to a second execution waiting queue of the at least one shared execution waiting queue and a number of tokens in the second execution waiting queue required by a third thread instruction dispatching request of the plurality of thread instruction dispatching requests being not greater than a number of tokens currently available in the second execution waiting queue, determining that the second thread instruction dispatching request and the third thread instruction dispatching request have conflict with respect to the second execution waiting queue.

For example, in a method provided in at least one embodiment of the present disclosure, selecting and responding to one thread instruction dispatching request from the plurality of thread instruction dispatching requests based on the determining include: adding at least one of the plurality of thread instruction dispatching requests to a candidate request set based on the determining; and selecting and responding to one thread instruction dispatching request from the candidate request set based on priorities of the plurality of threads.

For example, in a method provided in at least one embodiment of the present disclosure, adding the at least one of the plurality of thread instruction dispatching requests to the candidate request set based on the determining includes: in response to existence of a fourth thread instruction dispatching request having no congestion and no conflict with respect to the plurality of execution waiting queues among the plurality of thread instruction dispatching requests, adding the fourth thread instruction dispatching request to the candidate request set.

For example, in a method provided in at least one embodiment of the present disclosure, adding the at least one of the plurality of thread instruction dispatching requests to the candidate request set based on the determining includes: in response to non-existence of the fourth thread instruction dispatching request among the plurality of thread instruction dispatching requests and existence of a fifth thread instruction dispatching request having conflict with respect to the plurality of execution waiting queues among the plurality of thread instruction dispatching requests, adding the fifth thread instruction dispatching request to the candidate request set.

For example, in a method provided in at least one embodiment of the present disclosure, selecting one thread instruction dispatching request from the candidate request set based on the priorities of the plurality of threads includes: determining current priorities of the plurality of threads using a least recently used algorithm; and selecting a thread instruction dispatching request with a highest priority from the candidate request set.

For example, in a method provided in at least one embodiment of the present disclosure, determining the current priorities of the plurality of threads using the least recently used algorithm includes: initializing the priorities of the plurality of threads; and in response to selecting a first thread of the plurality of threads in a previous clock cycle, setting a priority of the first thread in a current clock cycle to a lowest priority and progressively increasing priorities of other threads than the first thread among the plurality of threads.

For example, in a method provided in at least one embodiment of the present disclosure, selecting one thread instruction dispatching request from the candidate request set based on the priorities of the plurality of threads includes: determining the current priorities of the plurality of threads using a round-robin algorithm.

For example, in a method provided in at least one embodiment of the present disclosure, the plurality of threads include at least 3 threads.

At least one embodiment of the present disclosure further provides an instruction dispatching apparatus. The instruction dispatching apparatus includes a receiving unit, a determination unit and a selection unit.

The receiving unit is in communication connection with a multithreaded processor and configured to receive a plurality of thread instruction dispatching requests sent by a plurality of decoded instruction queues of the multithreaded processor, respectively, each of the plurality of thread instruction dispatching requests including a plurality of instructions needing to be transmitted to execution waiting queues of corresponding types, respectively. The determination unit is in communication connection with a multithreaded processor and configured to determine whether the plurality of thread instruction dispatching requests have congestion and conflict with respect to a plurality of execution waiting queues of the multithreaded processor. The selection unit is configured to select and respond to one thread instruction dispatching request from the plurality of thread instruction dispatching requests, based on the determining.

For example, in an instruction dispatching apparatus provided in at least one embodiment of the present disclosure, the determination unit includes a combination determination subunit. The combination determination subunit is configured to determine whether the plurality of thread instruction dispatching requests have congestion and conflict with respect to the plurality of execution waiting queues based on a number of tokens currently available for each of the plurality of execution waiting queues.

For example, in an instruction dispatching apparatus provided in at least one embodiment of the present disclosure, the combination determination subunit includes a congestion determination unit. The congestion determination unit is configured to, in response to a number of tokens in a first execution waiting queue of the plurality of execution waiting queues required by a first thread instruction dispatching request of the plurality of thread instruction dispatching requests being greater than a number of tokens currently available in the first execution waiting queue, determine that the first thread instruction dispatching request has congestion with respect to the first execution waiting queue.

For example, in an instruction dispatching apparatus provided in at least one embodiment of the present disclosure, the plurality of execution waiting queues includes at least one shared execution waiting queue shared by a plurality of threads, and the combination determination subunit includes a conflict determination unit. The conflict determination unit is configured to, in response to a second thread instruction dispatching request of the plurality of thread instruction dispatching requests having congestion with respect to a second execution waiting queue of the at least one shared execution waiting queue and a number of tokens in the second execution waiting queue required by a third thread instruction dispatching request of the plurality of thread instruction dispatching requests being not greater than a number of tokens currently available in the second execution waiting queue, determine that the second thread instruction dispatching request and the third thread instruction dispatching request have conflict with respect to the second execution waiting queue.

For example, in an instruction dispatching apparatus provided in at least one embodiment of the present disclosure, the selection unit includes a candidate selection unit and a priority selection unit. The candidate selection unit is configured to add, at least one of the plurality of thread instruction dispatching requests to a candidate request set based on the determining. The priority selection unit is configured to select and respond to one thread instruction dispatching request from the candidate request set based on priorities of the plurality of threads.

At least one embodiment of the present disclosure further provides a data processing apparatus, which includes the instruction dispatching apparatus provided by any of the above embodiments, a plurality of decoded instruction queues, and a plurality of execution waiting queues.

At least one embodiment of the present disclosure further provides a processor, which includes the data processing apparatus provided by any of the above embodiments.

At least one embodiment of the present disclosure further provides an electronic device, which includes a processor; and a memory, the memory includes one or more computer program modules. The one or more computer program modules are stored in the memory and configured to be executed by the processor; and the one or more computer program modules include instructions for implementing the instruction dispatching method provided by any of the above embodiments.

At least one embodiment of the present disclosure further provides a non-transient readable storage medium, on which computer instructions are stored. The computer instructions, upon being executed by a processor, implement the instruction dispatching method provided by any of the above embodiments.

BRIEF DESCRIPTION OF DRAWINGS

To more clearly illustrate the embodiments of the present disclosure, the drawings required to be used for the embodiments are briefly described in the following. It is obvious that the drawings described below are only some embodiments of the present disclosure and are not a limitation of the present disclosure.

FIG. 1 is a flowchart of an instruction dispatching method for a multithreaded processor provided by at least one embodiment of the present disclosure;

DETAILED DESCRIPTION

Figure 2:
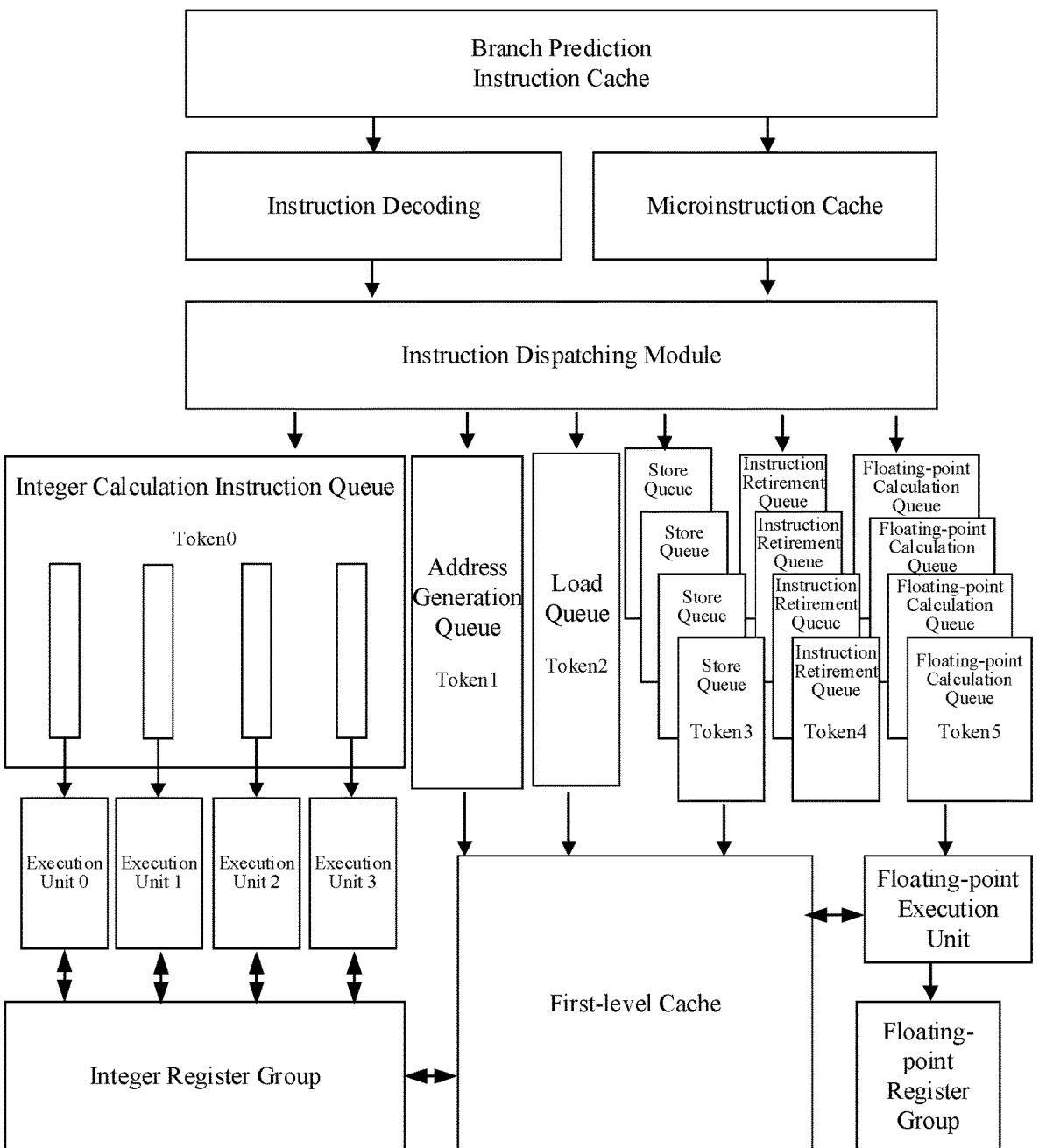
FIG. 2 is an exemplary structural block diagram of a multithreaded processor provided by at least one embodiment of the present disclosure.

In order to make objects, technical details and advantages of the embodiments of the present disclosure apparent, the technical solutions of the embodiments are described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Flowcharts are used in the present disclosure to illustrate the operations performed by the system according to the embodiments of the present application. It should be understood that the preceding or following operations are not necessarily performed in an exact order. Instead, various steps may be processed in reverse order or concurrently, as desired. At the same time, other operations can be added to these procedures, or a certain step or steps can be removed from these procedures.

Unless otherwise defined, all the technical and scientific terms used herein have the same meanings as commonly understood by those of ordinary skill in the art to which the present disclosure belongs. The terms "first", "second", and the like, which are used in the description and the claims of the present disclosure, are not intended to indicate any sequence, amount or importance, but used to distinguish various components. Similarly, the terms "a", "an", "the", or the like are not intended to indicate a limitation of quantity, but indicate that there is at least one. The terms, such as "comprise/comprising", "include/including", or the like are intended to specify that the elements or the objects stated before these terms encompass the elements or the objects and equivalents thereof listed after these terms, but not preclude other elements or objects. The terms, such as "connect/connecting/connected", "couple/coupling/coupled", or the like, are not limited to a physical connection or mechanical connection, but may include an electrical connection/coupling, directly or indirectly. The terms, "on", "under", "left", "right", or the like are only used to indicate relative position relationship, and when the position of the object which is described is changed, the relative position relationship may be changed accordingly.

A simultaneous multithreaded (SMT) processor needs to arbitrate between a plurality of threads to select instructions of one thread for dispatching to a back-end execution unit at an instruction dispatching stage. Typically, the following two aspects need to be considered in arbitration between a plurality of threads. The first aspect is efficiency. The arbitration between a plurality of threads requires the concurrency of the multithreaded processor to be improved as much as possible so that the advantages of a multithreaded architecture can be brought into play, thereby improving the overall performance. For example, some threads may need a lot of resources, but the back-end execution unit has no sufficient resources. It should be avoided to select such a thread in arbitration; otherwise, it may result in dispatching congestion and reduced overall performance. The other aspect is fairness. Each of a plurality of threads should have an equal opportunity to be selected, and the case in which some threads are always selected and some threads can never be selected should be avoided.

The inventor notices that SMT of an existing processor supports two threads, and the scheduling of the two threads is simple, for example, based on a time slice. In other words, a thread is prioritized within a certain time, and another thread is prioritized within another time. In particular, thread A and thread B correspond to time slice 1 and time slice 2, respectively. At the beginning, the thread A is prioritized, and the time slice 1 is adjusted based on whether the thread B takes extra time previously: new time slice 1=old time slice 1+extra time taken by the thread B previously. In the new time slice 1, only dispatching by the thread A is allowed and dispatching by the thread B is prevented until the time slice 1 expires. Subsequently, the thread B is prioritized instead until dispatching by the thread B is successful. However, because the resource required by the thread B may have been occupied by the thread A and cannot be released temporarily, the time of dispatching by the thread B may exceed the time slice 2. The exceeding time is recorded and used to update the time slice 1.

The scheduling technique based on a time slice has the following two problems. The first problem is low efficiency. When the thread A and the thread B are not full-loaded, the thread A or the thread B does not have instructions dispatched in each clock cycle. For example, in time slice 1, only instructions of the thread A can be dispatched. However, if the thread A has no instructions dispatched in many clock cycles and there are instructions on the thread B, there will be no instruction dispatched in these clock cycles, resulting in reduced overall performance of the processor. The second problem is that the "livelock" phenomenon may occur. For example, a thread always fails in dispatching. It is assumed that both of the thread A and the thread B require some common resources and the thread A require more resources. The thread A fails in dispatching because the required resources are insufficient every time in the time slice 1. When the thread B is prioritized, because the thread B requires less resources, the released resource may be occupied by the thread B. This eventually leading to the resources required by the thread A being always insufficient, resulting in the "livelock" phenomenon.

At least for the purpose of overcoming the above technical problems, at least one embodiment of the present disclosure provides an instruction dispatching method for a multithreaded processor. The multithreaded processor includes a plurality of decoded instruction queues and a plurality of execution waiting queues. The plurality of decoded instruction queues are used for a plurality of threads, respectively. The plurality of execution waiting queues are used for a plurality of execution units of corresponding types, respectively. The plurality of execution waiting queues include at least one shared execution waiting queue shared by the plurality of threads and a plurality of independent execution waiting queues used for the plurality of threads, respectively. The instruction dispatching method includes: receiving a plurality of thread instruction dispatching requests sent by the plurality of decoded instruction queues, respectively, each of the plurality of thread instruction dispatching requests including a plurality of instructions needing to be transmitted to execution waiting queues of corresponding types, respectively; determining whether the plurality of thread instruction dispatching requests have congestion and conflict with respect to the plurality of execution waiting queues; and selecting and responding to one thread instruction dispatching request from the plurality of thread instruction dispatching requests based on the determination.

Correspondingly, at least one embodiment of the present disclosure further provides a data processing apparatus, a processor, an electronic device, and a non-transient readable storage medium corresponding to the instruction dispatching method.

In the instruction dispatching method provided in the at least one embodiment of the present disclosure, by determining whether the plurality of thread instruction dispatching requests sent by the plurality of decoded instruction queues respectively have congestion and conflict with respect to the plurality of execution waiting queues and selecting one thread instruction dispatching request based on the determination, the "livelock" phenomenon can be avoided. In some embodiments, by selecting and responding to one thread instruction dispatching request from the plurality of thread instruction dispatching requests sent by the plurality of decoded instruction queues respectively, the case in which a decoded instruction queue has no instructions dispatched and is selected can be avoided.

The instruction dispatching method for a multithreaded processor provided according to the present disclosure is described below without limitations by means of a plurality of embodiments and examples thereof. As described below, different features in these specific examples or embodiments may be combined with one another without conflict to derive new examples or embodiments, and these new examples or embodiments also fall into the protection scope of the present disclosure.

FIG. 1 is an exemplary flowchart of an instruction dispatching method for a multithreaded processor provided by at least one embodiment of the present disclosure, and FIG. 2 is an exemplary structural block diagram of a multithreaded processor provided by at least one embodiment of the present disclosure.

For example, as shown in FIG. 1, at least one embodiment of the present disclosure provides an instruction dispatching method 10 for a multithreaded processor. The multithreaded processor includes a plurality of decoded instruction queues and a plurality of execution waiting queues. For example, in some examples, the plurality of decoded instruction queues are used for a plurality of threads, respectively, and the plurality of execution waiting queues are used for a plurality of execution units of corresponding types, respectively. For example, in some examples, the plurality of execution waiting queues include at least one shared execution waiting queue shared by the plurality of threads and a plurality of independent execution waiting queues used for the plurality of threads, respectively. As shown in FIG. 1, the instruction dispatching method 10 includes the following steps S101 to S103.

Step S101: receiving a plurality of thread instruction dispatching requests sent by a plurality of decoded instruction queues, respectively, each of the plurality of thread instruction dispatching requests including a plurality of instructions needing to be transmitted to execution waiting queues of corresponding types, respectively.

Step S102: determining whether the plurality of thread instruction dispatching requests have congestion and conflict with respect to a plurality of execution waiting queues.

Step S103: selecting and responding to one thread instruction dispatching request from the plurality of thread instruction dispatching requests based on the determining.

It should be noted that in the embodiments of the present disclosure, the instruction dispatching method 10 shown in FIG. 1 may be applied to various multithreaded processors, such as a multithreaded processor including two threads, and multithreaded processors including 4, 6, and 8 threads, which will not be limited in the embodiments of the present disclosure and may be set according to actual needs.

For example, in at least one embodiment of the present disclosure, the instruction dispatching method 10 shown in FIG. 1 may be applied to the multithreaded processor shown in FIG. 2. For example, as shown in FIG. 2, a four-threaded processor includes an instruction dispatching module configured to receive instructions (e.g., microinstructions) obtained by front-end decoding or instructions (e.g., microinstructions) cached previously (these instructions/microinstructions correspond to the plurality of threads, respectively) and select the instructions (e.g., microinstructions) of one thread for dispatching to the back-end execution waiting queues. For example, in some embodiments, the plurality of execution waiting queues may include an integer calculation instruction queue, an address generation queue, a load queue, a store queue, an instruction retirement queue, a floating-point calculation queue, etc. shown in FIG. 2, which will not be particularly limited in the embodiments of the present disclosure and may be set according to actual needs. Different instructions are of different types and thus enters different execution waiting queues. For example, in some embodiments, integer calculation instructions enter the integer calculation instruction queue, and read memory instructions enters the address generation queue and the load queue, floating-point instructions enter the floating-point calculation queues, which will not be particularly limited in the embodiments of the present disclosure.

Due to limited space of each execution waiting queue, to avoid overflow of the instructions in each execution waiting queue (e.g., new instructions are continuously written to a full execution waiting queue), the left space of each execution waiting queue or the number of available resources typically needs to be calculated. That is, the number of tokens corresponding to each execution waiting queue is calculated herein.

As shown in FIG. 2, the integer calculation instruction queue, the address generation queue, and the load queue correspond to token 0, token 1, and token 2, respectively, and the store queue, the instruction retirement queue, and the floating-point instruction queue correspond to token 3, token 4, and token 5, respectively. Such execution waiting queues are used for the plurality of execution units of the corresponding types, such as execution units 0-3 and the floating-point execution unit shown in FIG. 2. A first-level cache, an integer register group, a floating-point register group, and the like work in coordination with the execution units described above.

The plurality of execution waiting queues include at least one shared execution waiting queue shared by the plurality of threads and the plurality of independent execution waiting queues used for the plurality of threads, respectively. For example, in the embodiment shown in FIG. 2, the integer calculation instruction queue, the address generation queue, and the load queue are shared by the plurality of threads, and thus may be referred to as shared execution waiting queues. The store queue, the instruction requirement queue, and the floating-point instruction queue are set individually for each thread of the plurality of threads, and thus may be referred to as independent execution waiting queues. For example, in some embodiments, tokens are classified into two types: a shared token and an independent token. For example, in the example shown in FIG. 2, the tokens 0, 1, and 2 are shared tokens, and the tokens 3, 4, and 5 are independent tokens.

It should be noted that the four-threaded processor shown in FIG. 2 is merely an example. The multithreaded processor in the embodiments of the present disclosure may include more or less threads, and may also include more or less components, which will not be limited in the embodiments of the present disclosure.

Figure 3:
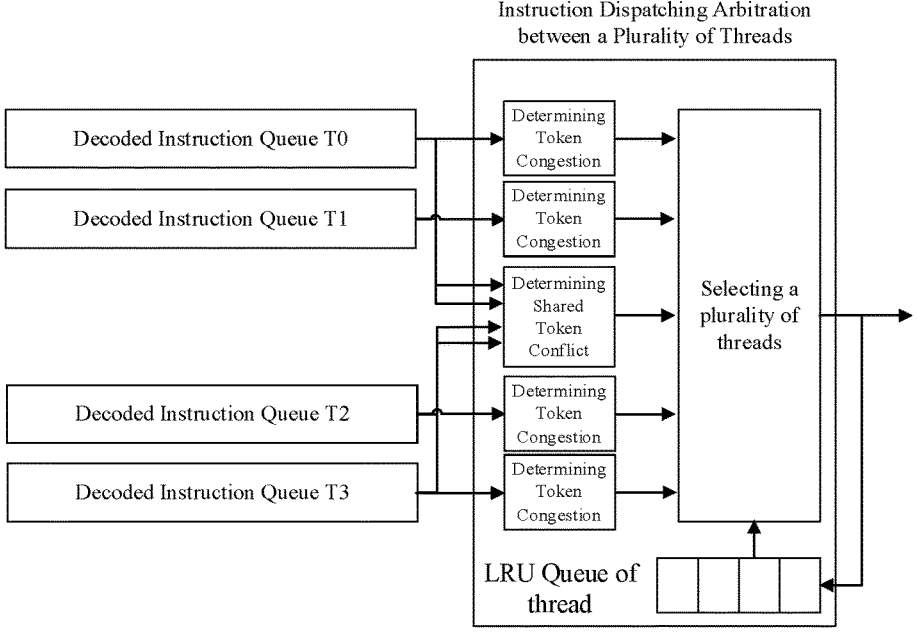
FIG. 3 is a schematic diagram of instruction dispatching arbitration between a plurality of threads provided by at least one embodiment of the present disclosure.

FIG. 3 is a schematic diagram of instruction dispatching arbitration between a plurality of threads provided by at least one embodiment of the present disclosure.

For example, in at least one embodiment of the present disclosure, for step S101, a plurality of thread instruction dispatching requests sent by a plurality of decoded instruction queues respectively are received, where each of the plurality of thread instruction dispatching requests includes a plurality of instructions needing to be transmitted to execution waiting queues of corresponding types, respectively. For example, in some embodiments, decoded or cached instructions are stored in the plurality of decoded instruction queues, and each thread of a plurality of threads corresponds to an independent decoded instruction queue. For example, in the embodiment shown in FIG. 3, four threads correspond to the decoded instruction queue T0, the decoded instruction queue T1, the decoded instruction queue T2, and the decoded instruction queue T3. A decoded instruction queue may output a plurality of instructions within one clock cycle, and different instructions enter the execution waiting queues of the corresponding types.

For example, in one example, the decoded instruction queue T1 has a set of instructions to be transmitted in the current cycle, and then the decoded instruction queue T1 may send one thread instruction dispatching request to the instruction dispatching module. For example, in another example, the decoded instruction queue T2 has no instructions needing to be transmitted in the current cycle, and then the decoded instruction queue T2 may send no thread instruction dispatching request to the instruction dispatching module. Thus, the instruction dispatching module may not select the thread having no instructions needing to be dispatched, thereby avoiding resource waste and improving the overall performance of the whole processor.

For example, in at least one embodiment of the present disclosure, for step S102, determining whether the plurality of thread instruction dispatching requests have congestion and conflict with respect to the plurality of execution waiting queues may include: determining whether the plurality of thread instruction dispatching requests have congestion and conflict with respect to the plurality of execution waiting queues based on the number of tokens currently available for each of the plurality of execution waiting queues. Thus, by comparing the number of tokens required by a thread instruction dispatching request with the number of tokens left in the execution waiting queue, whether a set of instructions of the request will lead to congestion can be determined in advance, thereby avoiding the selection of the thread that will lead to congestion to achieve the purpose of improving the efficiency.

It should be noted that, in the embodiments of the present disclosure, the number of tokens currently available in each execution waiting queue is used for representing the available/left space of the execution waiting queue in the current clock cycle.

For example, in the embodiment shown in FIG. 3, after the plurality of thread instruction dispatching requests sent by the plurality of decoded instruction queues T0/T1/T2/T3 respectively are received, when instruction dispatching arbitration is performed between the plurality of threads, token congestion determination and shared token conflict determination need to be performed.

For example, in at least one embodiment of the present disclosure, the token congestion determination may include: in response to the number of tokens in a first execution waiting queue of the plurality of execution waiting queues required by a first thread instruction dispatching request of the plurality of thread instruction dispatching requests being greater than the number of tokens currently available in the first execution waiting queue, determining that the first thread instruction dispatching request has congestion with respect to the first execution waiting queue.

It should be noted that, in the embodiments of the present disclosure, the first thread instruction dispatching request is used for representing any thread instruction dispatching request of the plurality of thread instruction dispatching requests, and the first execution waiting queue is used for representing any execution waiting queue of the plurality of execution waiting queues. The first thread instruction dispatching request or the first execution waiting queue is not limited to a particular thread instruction dispatching request or execution waiting queue, and not limited to a particular order, which may be set according to actual needs.

For example, in at least one embodiment of the present disclosure, for the token congestion determination, a set of instructions output by a decoded instruction queue within one clock cycle are regarded as a whole. If a thread (a decoded instruction queue) is selected and the required tokens are insufficient, a set of instructions of the thread will be congested as a whole, and part of instructions in the set of instructions cannot be dispatched.

For example, in at least one embodiment of the present disclosure, a total number of various tokens required needs to be calculated according to a type of a set of instructions output by a decoded instruction queue within one clock cycle, and then is compared with the number of tokens left/available in each corresponding execution waiting queue. If the tokens left/available in an execution waiting queue are insufficient, the thread may be congested even though being selected by arbitration and is prevented from dispatching.

Figure 4:
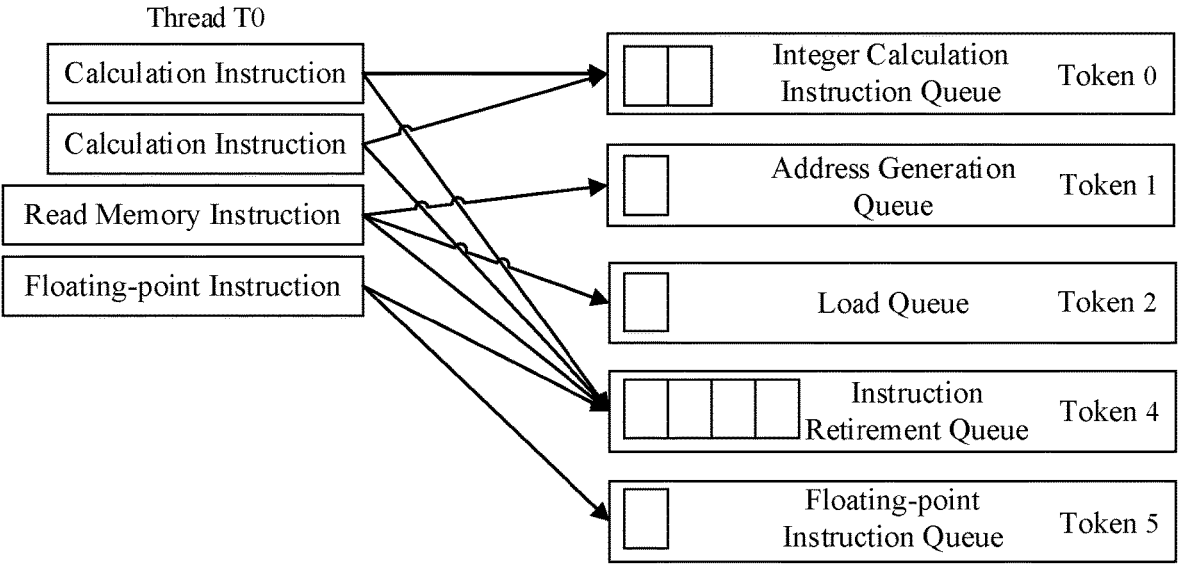
FIG. 4 is a schematic block diagram of an operation of determining token congestion provided by at least one embodiment of the present disclosure.

FIG. 4 is a schematic block diagram of an operation of determining token congestion provided by at least one embodiment of the present disclosure.

For example, in at least one embodiment of the present disclosure, as shown in FIG. 4, decoded instruction queues T0 to T3 are used for threads T0 to T3, respectively. A set of instructions to be transmitted by the decoded instruction queue T0 (for the sake of simplicity, also referred to as the thread T0) includes one read instruction, two addition instructions, and one floating-point instruction, and the number of tokens of each execution waiting queue required is as follows: two tokens 0 (corresponding to the integer calculation instruction queue), one token 1 (corresponding to the address generation queue), one token 2 (corresponding to the load queue), four tokens 4 (corresponding to the instruction requirement queue), and one token 5 (corresponding to the floating-point instruction queue). If the number of tokens currently available in any execution waiting queue is less than the number of tokens required by the decoded instruction queue T0, it indicates that the set of instructions of the decoded instruction queue T0 cannot be all put into each execution waiting queue, and it may be determined that the corresponding thread T0 has congestion.

For example, in one example, the decoded instruction queue T0 requires four tokens 4. However, the number of the tokens currently available in the instruction retirement queue is 2, i.e., two tokens 4 are left currently. In this case, the number of the tokens 4 required by the decoded instruction queue T0 is greater than the number of the tokens 4 currently available in the instruction requirement queue, and the decoded instruction queue T0 has congestion with respect to the instruction requirement queue. In other words, the thread instruction dispatching request sent by the decoded instruction queue T0 has congestion with respect to the instruction retirement queue. For another example, in another one example, the decoded instruction queue T0 requires one token 1. However, the number of the tokens currently available in the address generation queue is 2, i.e., two tokens 1 are left currently. In this case, the number of the tokens 1 required by the decoded instruction queue T0 is less than the number of the tokens 1 currently available in the address generation queue, and the decoded instruction queue T0 has no congestion with respect to the address generation queue. In other words, the thread instruction dispatching request sent by the decoded instruction queue T0 has no congestion with respect to the address generation queue.

For example, in at least one embodiment of the present disclosure, the shared token conflict determination includes: in response to a second thread instruction dispatching request of the plurality of thread instruction dispatching requests having congestion with respect to a second execution waiting queue of the at least one shared execution waiting queue and the number of tokens in the second execution waiting queue required by a third thread instruction dispatching request of the plurality of thread instruction dispatching requests being not greater than the number of tokens currently available in the second execution waiting queue, determining that the second thread instruction dispatching request has conflict with respect to the second execution waiting queue.

It should be noted that, in the embodiments of the present disclosure, the second thread instruction dispatching request is used for representing any thread instruction dispatching request of the plurality of thread instruction dispatching requests, and the third thread instruction dispatching request is used for representing any thread instruction dispatching request other than the second thread instruction dispatching request in the plurality of thread instruction dispatching requests. The second execution waiting queue is used for representing any shared execution waiting queue of the at least one shared execution waiting queue. The second thread instruction dispatching request and the third thread instruction dispatching request are not limited to a particular thread instruction dispatching request and not limited to a particular order, which may be set according to actual needs. The second execution waiting queue is not limited to a particular execution waiting queue and not limited to a particular order, which may be set according to actual needs.

For example, in at least one embodiment of the present disclosure, with reference to FIG. 2 and FIG. 4, the integer calculation instruction queue, the address generation queue, and the load queue are shared execution waiting queues shared by a plurality of threads. In other words, the token 0, the token 1, and the token 2 are shared tokens. For example, in one example, a set of instructions included in the thread instruction dispatching request sent by the decoded instruction queue T0 is as shown in FIG. 4, and the decoded instruction queue T0 currently needs one shared token 2. In the case of the decoded instruction queue T1 needing 4 shared tokens 2 and one token being left/available in the read memory instruction queue, the decoded instruction queue T1 has congestion with respect to the read memory instruction queue, and the decoded instruction queue T0 has no congestion with respect to the read memory instruction queue. Therefore, the decoded instruction queue T1 is determined as having conflict with respect to the read memory instruction queue, and the other decoded instruction queue (i.e., the decoded instruction queue T0) requesting the shared execution waiting queue (i.e., the read memory instruction queue) is also determined as having conflict.

Assuming that the decoded instruction queue T0 subsequently outputs only one read memory instruction in each clock cycle and the read memory instruction queue releases one token in each clock cycle, the decoded instruction queue T0 (the thread T0) will be selected each time only according to the congestion condition, and the four tokens 2 required by the decoded instruction queue T1 (the thread T1) cannot be satisfied throughout. This case is referred to as "livelock".

For example, in at least one embodiment of the present disclosure, for step S103, selecting and responding to one thread instruction dispatching request from the plurality of thread instruction dispatching requests based on the determination, include: adding at least one of the plurality of thread instruction dispatching requests to a candidate request set based on the determining; and selecting and responding to one thread instruction dispatching request from the candidate request set based on priorities of the plurality of threads.

For example, in at least one embodiment of the present disclosure, in response to existence of a fourth thread instruction dispatching request having no congestion and no conflict with respect to the plurality of execution waiting queues among the plurality of thread instruction dispatching requests, the fourth thread instruction dispatching request is added to the candidate request set.

For example, in some examples, in the existence of a non-congested and non-conflicting thread among the plurality of threads, the thread instruction dispatching request sent by the non-congested and non-conflicting thread may be directly put into the candidate request set, and congested or conflicting threads will not be selected. Thus, the performance waste of the processor is avoided and the processing efficiency is improved.

For example, in at least one embodiment of the present disclosure, in response to the non-existence of fourth thread instruction dispatching request among the plurality of thread instruction dispatching requests and the existence of a fifth thread instruction dispatching request having conflict with respect to the plurality of execution waiting queues among the plurality of thread instruction dispatching requests, the fifth thread instruction dispatching request is added to the candidate request set.

For example, in some embodiments, in the non-existence of the non-congested and non-conflicting thread among the plurality of threads, if there is a conflicting thread, the thread instruction dispatching requests sent by the conflicting threads can be put into the candidate request set. Thus, the livelock phenomenon may not be caused in a thread congested at a shared token as the shared token is occupied by other threads. In other words, in the non-existence of no non-congested and non-conflicting thread, the conflicting threads may also have the opportunity to be selected, thereby avoiding livelock.

For example, the thread T0 and the thread T1 have conflict for a shared token, the thread T2 has congestion for an independent token, and the thread T3 has no conflict and no congestion. In the case described above, only the thread instruction dispatching request sent by the thread T3 may be added to the candidate request set. For another example, the thread T0 and the thread T1 have conflict for a shared token, and the thread T2 and the thread T3 have congestion. In the case of having no non-congested and non-conflicting thread described above, the thread instruction dispatching requests sent by the conflicting thread T0 and thread T1 can be added to the candidate request set for selection.

It should be noted that, in the embodiments of the present disclosure, the fourth thread instruction dispatching request is used for representing any thread instruction dispatching request having no congestion and no conflict, and the fifth thread instruction dispatching request is used for representing any thread instruction dispatching request having conflict. Both of the fourth thread instruction dispatching request and the fifth thread instruction dispatching request are not limited to a particular thread instruction dispatching request and not limited to a particular order, which may be set according to actual needs.

For example, in at least one embodiment of the present disclosure, after the candidate request set is obtained based on the above determination, one thread may be selected from the candidate request set according to the priority of each thread.

For example, in at least one embodiment of the present disclosure, the current priorities of the plurality of threads are determined according to a least recently used (LRU) algorithm, and the thread instruction dispatching request with the highest priority is selected from the candidate request set. The priority of each thread is adjusted by the LRU algorithm. If the thread T1 does not send instructions recently and other threads have records of sending instructions, the priority of the thread T1 is adjusted to the highest priority.

For example, in at least one embodiment of the present disclosure, determining the current priorities of the plurality of threads by the LRU algorithm may include: initializing the priorities of the plurality of threads; in response to selecting a first thread of the plurality of threads in a previous clock cycle, setting a priority of the first thread in a current clock cycle to the lowest priority and progressively increasing the priorities of other threads than the first thread among the plurality of threads.

It should be noted that, in the embodiments of the present disclosure, the first thread is used for representing any thread of the plurality of threads, and is not limited to a particular thread and not limited to a particular order, which may be set according to actual needs.

Figure 5:
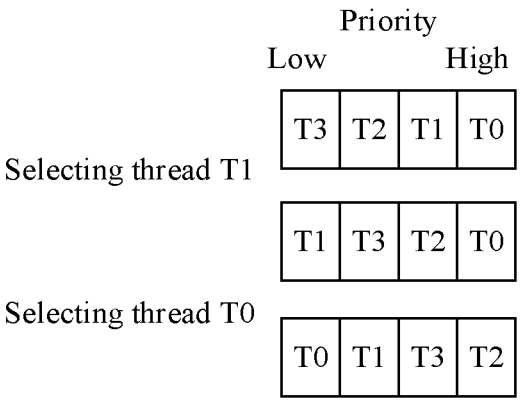
FIG. 5 is a schematic diagram of adjusting priorities of a plurality of threads according to a least recently used (LRU) algorithm provided by at least one embodiment of the present disclosure.

FIG. 5 is a schematic diagram of adjusting priorities of a plurality of threads by a least recently used (LRU) algorithm provided by at least one embodiment of the present disclosure.

For example, in at least one embodiment of the present disclosure, as shown in FIG. 5, for the plurality of threads T0, T1, T2, and T3, the priority of each thread is initialized first. For example, the initialized priorities of the plurality of threads are ranked (from high to low) as T0, T1, T2, and T3. In response to selecting the thread T1 in a first clock cycle, in next clock cycle (a second clock cycle), the priority of the thread T1 is adjusted to the lowest priority, and the priorities of other threads (threads T0, T2, and T3) are increased progressively. In other words, in the second clock cycle, the priorities of the plurality of threads are ranked (from high to low) as T0, T2, T3, and T1. In response to selecting the thread T0 in the second clock cycle, in next clock cycle (a third clock cycle), the priority of the thread T0 is adjusted to the lowest priority, and the priorities of other threads (threads T1, T2, and T3) are increased progressively. In other words, in the third clock cycle, the priorities of the plurality of threads are ranked (from high to low) as T2, T3, T1, and T0.

For example, in at least one embodiment of the present disclosure, the LRU algorithm may be implemented by using a queue including a plurality of units, and each unit in the queue stores a thread serial number. For example, the priority of the thread at the head of the queue is the highest, and the priority of the thread at the tail of the queue is the lowest. The serial number of the thread selected by arbitration is deleted from the queue each time and inserted to the tail of the queue again, indicating that the thread was selected previously and the priority thereof is then adjusted to the lowest priority.

By adjusting the priority of each thread using the LRU algorithm, the least recently used thread is set to the highest priority so that the fairness of dispatching by a plurality of threads can be guaranteed.

For example, in at least one embodiment of the present disclosure, the current priorities of the plurality of threads can be determined according to a round-robin algorithm.

Figure 6:
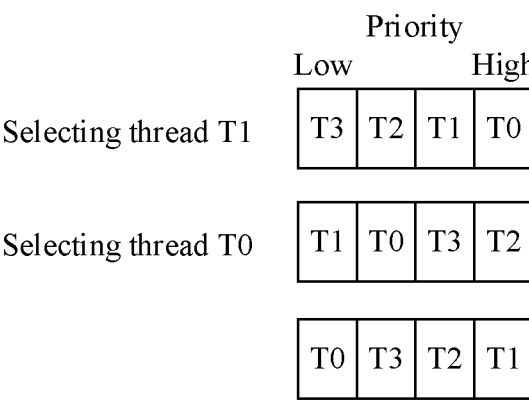
FIG. 6 is a schematic diagram of adjusting priorities of a plurality of threads according to a round-robin algorithm provided by at least one embodiment of the present disclosure.

FIG. 6 is a schematic diagram of adjusting priorities of a plurality of threads by the round-robin algorithm provided by at least one embodiment of the present disclosure.

For example, in at least one embodiment of the present disclosure, as shown in FIG. 6, for a plurality of threads T0, T1, T2, and T3, the priority of each thread is initialized first. For example, the initialized priorities of the plurality of threads are ranked (from high to low) as T0, T1, T2, and T3. In response to selecting the thread T1 in the first clock cycle, in next clock cycle (the second clock cycle), the priority of the thread T1 is adjusted to the lowest priority, the priority of the thread (i.e., the thread T2) subsequent to the thread T1 is set to the highest priority, and other threads T0 and T3 are ranked in a circular fashion. In other words, in the second clock cycle, the priorities of the plurality of threads are ranked (from high to low) as T2, T3, T0, and T1. In response to selecting the thread T0 in the second clock cycle, in next clock cycle (the third clock cycle), the priority of the thread T0 is adjusted to the lowest priority, the priority of the thread (i.e., the thread T1) subsequent to the thread T0 is set to the highest priority, and other threads T2 and T3 are ranked in a circular fashion. In other words, in the third clock cycle, the priorities of the plurality of threads are ranked (from high to low) as T1, T2, T3, and T0.

By adjusting the priority of each thread using the round-robin algorithm which is simple, the fairness of dispatching by a plurality of threads can also be guaranteed.

It should be noted that, in the embodiments of the present disclosure, in addition to the LRU algorithm and the round-robin algorithm, other priority setting algorithms can be used, which will not be limited in the embodiments of the present disclosure and may be set according to actual needs.

Figure 7:
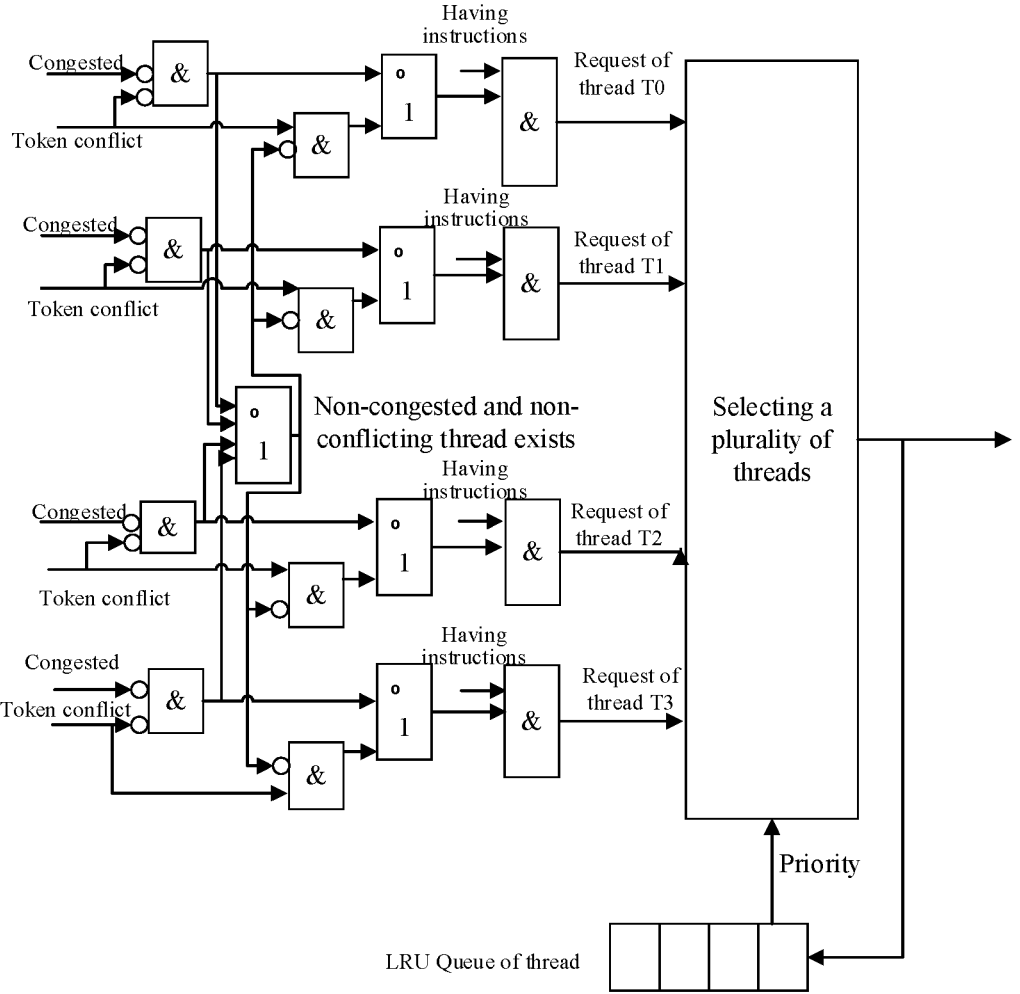
FIG. 7 is a schematic block diagram of an instruction dispatching method provided by at least one embodiment of the present disclosure.

FIG. 7 is a schematic block diagram of an instruction dispatching method provided by at least one embodiment of the present disclosure.

For example, in at least one embodiment of the present disclosure, as shown in FIG. 7, a plurality of threads are selected according to a request signal and a priority signal sent by each thread (decoded instruction queue), and finally the thread with the highest priority and valid request signal is selected from one or more threads with valid request signals. For example, for the four-multithreaded processor, as described above, whether each thread is not congested and non-conflicting is checked to obtain a corresponding determination signal. OR processing (expressed as ≥1 in FIG. 7) is performed on the respective determination signals of the four threads to obtain a determination signal whether the four threads include a non-congested and non-conflicting thread. NOT processing is performed on the determination signal whether the four threads include a non-congested and non-conflicting thread; the determination signal is subjected to AND processing (expressed as & in FIG. 7) with a token conflict signal of each thread, subjected to OR processing with the above-mentioned determination signal of each thread, and then subjected to AND processing with a signal of having instructions, thereby obtaining the final request signal. Next, one thread is selected and responded to in combination with the priority signals of the plurality of threads (e.g., according to the LRU algorithm, the round-robin algorithm, or the like).

Therefore, by the instruction dispatching method 10 for a multithreaded processor provided in at least one embodiment of the present disclosure, instruction dispatching by a plurality of threads can be more efficient and fairer, and the "livelock" phenomenon can be avoided. Thus, the overall performance of the multithreaded processor is improved.

For example, in at least one embodiment of the present disclosure, the plurality of threads include at least 3 threads. It should be noted that although the instruction dispatching method 10 provided in the embodiments of the present disclosure is described herein by taking the four-threaded processor for example, the instruction dispatching method 10 provided in the embodiments of the present disclosure is not merely applicable to the four-threaded processor, and is also applicable to a two-threaded processor, a three-threaded processor, a five-threaded processor, and the like, which will not be limited in the embodiments of the present disclosure.

It also should be noted that, in the various embodiments of the present disclosure, the order of performing the steps of the instruction dispatching method 10 is not limited. Although the performing process of the steps is described above in a particular order, the embodiments of the present disclosure are not limited thereto. The steps in the instruction dispatching method 10 can be performed in series or in parallel, which may be set according to actual needs. For example, the instruction dispatching method 10 may also include more or less steps, which will not be limited in the embodiments of the present disclosure.

Figure 8:
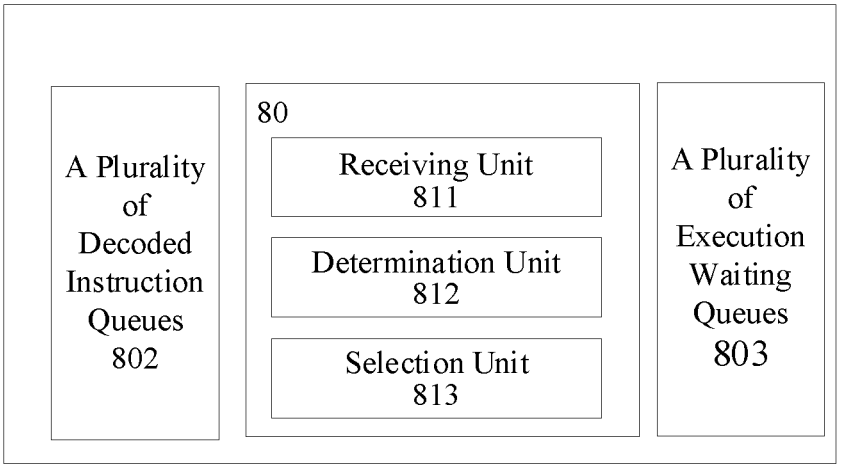
FIG. 8 is a schematic diagram of an instruction dispatching apparatus provided by at least one embodiment of the present disclosure.

FIG. 8 is a schematic diagram of an instruction dispatching apparatus provided by at least one embodiment of the present disclosure.

For example, as shown in FIG. 8, at least one embodiment of the present disclosure provides an instruction dispatching apparatus 80. The instruction dispatching apparatus 80 is in communication connection with a plurality of decoded instruction queues 802 and a plurality of execution waiting queues 803 of a multithreaded processor separately. For example, the plurality of decoded instruction queues 802 are used for a plurality of threads, respectively, and the plurality of execution waiting queues 803 are used for a plurality of execution units of corresponding types, respectively. For example, in some examples, the plurality of execution waiting queues 803 include at least one shared execution waiting queue shared by the plurality of threads and a plurality of independent execution waiting queues used for the plurality of threads, respectively. The instruction dispatching apparatus 80 includes a receiving unit 811, a determination unit 812, and a selection unit 813.

The receiving unit 811 is in communication connection with the multithreaded processor and is configured to receive a plurality of thread instruction dispatching requests sent by a plurality of decoded instruction queues of the multithreaded processor, respectively, each of the plurality of thread instruction dispatching requests including a plurality of instructions needing to be transmitted to execution waiting queues of corresponding types, respectively. For example, the receiving unit 811 may implement step S101, and the specific implementation method may be known with reference to the related description of step S101, which will not be described here redundantly.

The determination unit 812 is in communication connection with the multithreaded processor and is configured to determine whether the plurality of thread instruction dispatching requests have congestion and conflict with respect to a plurality of execution waiting queues of the multithreaded processor. For example, the determination unit 812 may implement step S102, and the specific implementation method may be known with reference to the related description of step S102, which will not be described here redundantly.

The selection unit 813 is configured to select and respond to one thread instruction dispatching request from the plurality of thread instruction dispatching requests based on the determining. For example, the selection unit 813 may implement step S103, and the specific implementation method may be known with reference to the related description of step S103, which will not be described here redundantly.

It should be noted that the receiving unit 811, the determination unit 812, and the selection unit 813 may be implemented by software, hardware, firmware, or any combination thereof. For example, the receiving unit 811, the determination unit 812, and the selection unit 813 may be implemented as a receiving circuit 811, a determination circuit 812, and a selection circuit 813, respectively. The specific implementations of them are not limited in the embodiments of the present disclosure.

For example, in at least one embodiment of the present disclosure, the determination unit 812 may include a combination determination subunit. For example, the combination determination subunit may be configured to determine whether the plurality of thread instruction dispatching requests have congestion and conflict with respect to the plurality of execution waiting queues based on the number of tokens currently available for each of the plurality of execution waiting queues. For example, the operations that can be implemented by the combination determination subunit may be known with reference to the foregoing related description of the instruction dispatching method 10, which will not be described here redundantly.

For example, in at least one embodiment of the present disclosure, the combination determination subunit may include a congestion determination unit and a conflict determination unit. For example, in some embodiments, the congestion determination unit is configured to, in response to the number of tokens in a first execution waiting queue of the plurality of execution waiting queues required by a first thread instruction dispatching request of the plurality of thread instruction dispatching requests being greater than the number of tokens currently available in the first execution waiting queue, determine that the first thread instruction dispatching request has congestion with respect to the first execution waiting queue. For example, the operations that can be implemented by the congestion determination unit may be known with reference to the foregoing related description of the instruction dispatching method 10, which will not be described here redundantly.

For example, in some embodiments, the conflict determination unit is configured to, in response to a second thread instruction dispatching request of the plurality of thread instruction dispatching requests having congestion with respect to a second execution waiting queue of the at least one shared execution waiting queue and the number of tokens in the second execution waiting queue required by a third thread instruction dispatching request of the plurality of thread instruction dispatching requests being not greater than the number of tokens currently available in the second execution waiting queue, determine that the second thread instruction dispatching request and the third thread instruction dispatching request have conflict with respect to the second execution waiting queue. For example, the operations that can be implemented by the conflict determination unit may be known with reference to the foregoing related description of the instruction dispatching method 10, which will not be described here redundantly.

For example, in at least one embodiment of the present disclosure, the selection unit 813 may include a candidate selection unit and a priority selection unit. For example, in some embodiments, the candidate selection unit is configured to add at least one of the plurality of thread instruction dispatching requests to a candidate request set based on the determining. The priority selection unit is configured to select and respond to one thread instruction dispatching request from the candidate request set based on priorities of the plurality of threads. For example, the operations that can be implemented by the candidate selection unit and the priority selection unit may be known with reference to the foregoing related description of the instruction dispatching method 10, which will not be described here redundantly.

For example, in at least one embodiment of the present disclosure, the candidate selection unit may include a direct selection unit and a conflict selection unit. For example, in some embodiments, the direct selection unit is configured to, in response to existence of a fourth thread instruction dispatching request having no congestion and no conflict with respect to the plurality of execution waiting queues among the plurality of thread instruction dispatching requests, add the fourth thread instruction dispatching request to the candidate request set. For example, in some embodiments, the conflict selection unit is configured to, in response to non-existence of the fourth thread instruction dispatching request among the plurality of thread instruction dispatching requests and existence of including a fifth thread instruction dispatching request having conflict for the plurality of execution waiting queues among the plurality of thread instruction dispatching requests, add the fifth thread instruction dispatching request to the candidate request set. For example, the operations that can be implemented by the direct selection unit and the conflict selection unit may be known with reference to the foregoing related description of the instruction dispatching method 10, which will not be described here redundantly.

For example, in at least one embodiment of the present disclosure, the priority selection unit may include a setting unit and a dispatching unit. For example, in some embodiments, the setting unit is configured to determine current priorities of the plurality of threads according to an LRU algorithm. The dispatching unit is configured to select a thread instruction dispatching request with the highest priority from the candidate request set. For example, the operations that can be implemented by the setting unit and the dispatching unit may be known with reference to the foregoing related description of the instruction dispatching method 10, which will not be described here redundantly.

For example, in at least one embodiment of the present disclosure, the setting unit may include an initialization unit and an adjustment unit. For example, in some embodiments, the initialization unit is configured to initialize the priorities of the plurality of threads. The adjustment unit is configured to, in response to selecting a first thread of the plurality of threads in a previous clock cycle, set a priority of the first thread in a current clock cycle to the lowest priority and progressively increase priorities of other threads than the first thread among the plurality of threads. For example, the operations that can be implemented by the initialization unit and the adjustment unit may be known with reference to the foregoing related description of the instruction dispatching method 10, which will not be described here redundantly.

For example, in at least one embodiment of the present disclosure, the plurality selection unit may include a setting subunit. The setting subunit is configured to determine the current priorities of the plurality of threads using a round-robin algorithm. For example, the operations that can be implemented by the setting subunit may be known with reference to the foregoing related description of the instruction dispatching method 10, which will not be described here redundantly.

For example, in at least one embodiment of the present disclosure, the plurality of threads include at least 3 threads.

It should be noted that the combination determination subunit, the congestion determination unit, the conflict determination unit, the candidate selection unit, the priority selection unit, the direct selection unit, the conflict selection unit, the setting unit, the dispatching unit, the initialization unit, the adjustment unit, and the setting subunit may be implemented by software, hardware, firmware, or any combination thereof. For example, the combination determination subunit, the congestion determination unit, the conflict determination unit, the candidate selection unit, the priority selection unit, the direct selection unit, the conflict selection unit, the setting unit, the dispatching unit, the initialization unit, the adjustment unit, and the setting subunit may be implemented as a combination determination sub-circuit, a congestion determination circuit, a conflict determination circuit, a candidate selection circuit, a priority selection circuit, a direct selection circuit, a conflict selection circuit, a setting circuit, a dispatching circuit, an initialization circuit, an adjustment circuit, and a setting sub-circuit, respectively. The specific implementations of them are not limited in the embodiments of the present disclosure.

It should be understood that the instruction dispatching apparatus 80 provided in at least one embodiment of the present disclosure may implement the instruction dispatching method 10 for a multithreaded processor described above and may also achieve technical effects similar to the instruction dispatching method 10. For example, by the instruction dispatching apparatus 80 provided in at least one embodiment of the present disclosure, the efficiency and fairness of instruction dispatching by a plurality of threads can be improved and the "livelock" phenomenon can be avoided.

It should be noted that, in the embodiments of the present disclosure, the instruction dispatching apparatus 80 may include more or less circuits or units, and connection relationships between the circuits or units are not limited, which may be set according to actual needs. Each circuit, which may be specifically formed in a non-limiting manner, may be composed of analog devices according to a circuit principle, and may also be composed of digital chips, or formed in other proper manners.

Figure 9:
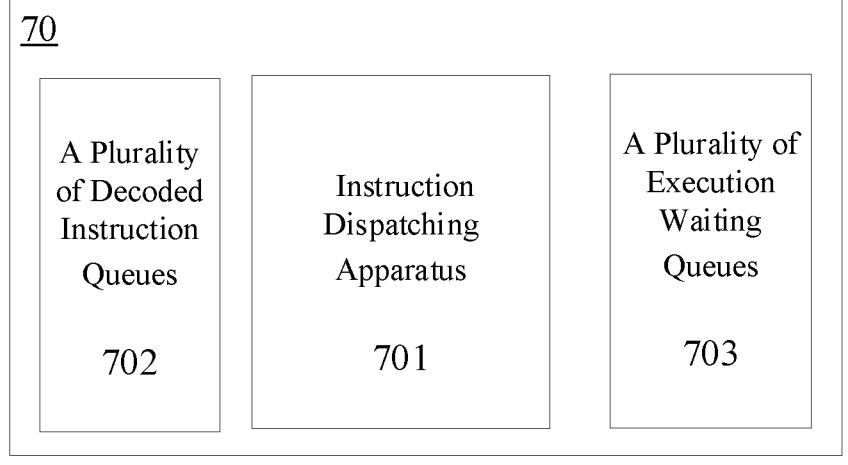
FIG. 9 is a schematic block diagram of a data processing apparatus provided by at least one embodiment of the present disclosure.

FIG. 9 is a schematic block diagram of a data processing apparatus 70 provided by at least one embodiment of the present disclosure.

For example, at least one embodiment of the present disclosure further provides a data processing apparatus 70. As shown in FIG. 9, the data processing apparatus 70 includes an instruction dispatching apparatus 701, a plurality of decoded instruction queues 702, and a plurality of execution waiting queues 703. For example, in some examples, the data processing apparatus 70 includes the instruction dispatching apparatus 80, the plurality of decoded instruction queues 802, and the plurality of execution waiting queues 803 shown in FIG. 8.

It should be noted that, in the embodiments of the present disclosure, the data processing apparatus 70 may include more or less circuits or units, and connection relationships between the circuits or units are not limited, which may be set according to actual needs. Each circuit, which may be specifically formed in a non-limiting manner, may be composed of analog devices according to a circuit principle, and may also be composed of digital chips, or formed in other proper manners.

It should be understood that the data processing apparatus 70 provided in at least one embodiment of the present disclosure may implement the instruction dispatching method 10 for a multithreaded processor described above and may also achieve technical effects similar to the instruction dispatching method 10. For example, by the data processing apparatus 70 provided in at least one embodiment of the present disclosure, the efficiency and fairness of instruction dispatching by a plurality of threads can be improved and the "livelock" phenomenon can be avoided, thereby improving the overall performance of the multi-threaded processor.

Figure 10:
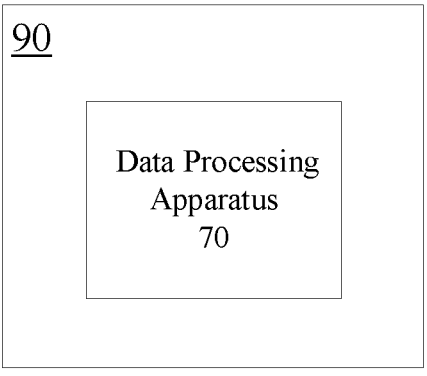
FIG. 10 is a schematic block diagram of a processor provided by at least one embodiment of the present disclosure.

FIG. 10 is a schematic block diagram of a processor provided by at least one embodiment of the present disclosure.

For example, at least one embodiment of the present disclosure further provides a processor 90. As shown in FIG. 10, the processor 90 includes the data processing apparatus 70 described in any of the foregoing embodiments. For example, in some embodiments, the processor 90 may be a multithreaded processor, e.g., a four-threaded processor. It should be understood that the processor 90 provided in at least one embodiment of the present disclosure may implement the instruction dispatching method 10 for a multi-threaded processor described above and may also achieve technical effects similar to the instruction dispatching method 10. For example, by the processor 90 provided in at least one embodiment of the present disclosure, the efficiency and fairness of instruction dispatching by a plurality of threads can be improved and the "livelock" phenomenon can be avoided, thereby improving the overall performance of the multithreaded processor.

Figure 11:
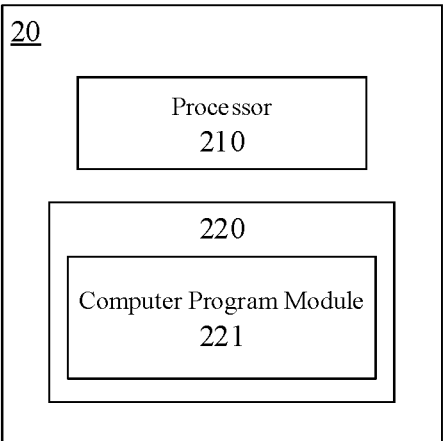
FIG. 11 is a schematic block diagram of an electronic device provided by at least one embodiment of the present disclosure.

FIG. 11 is a schematic block diagram of an electronic device provided by at least one embodiment of the present disclosure.

At least one embodiment of the present disclosure further provides an electronic device 20. As shown in FIG. 11, the electronic device 20 includes a processor 210 and a memory 220. The memory 220 includes one or more computer program modules 221. The one or more computer program modules 221 are stored in the memory 220 and configured to be executed by the processor 210. The one or more computer program modules 221 include instructions for performing the instruction dispatching method 10 provided in at least one embodiment of the present disclosure, and when the instructions are executed by the processor 210, one or more steps of the instruction dispatching method 10 provided in at least one embodiment of the present disclosure may be performed. The memory 220 and the processor 210 may be interconnected by means of a bus system and/or a connection mechanism in other form (not shown).

For example, the processor 210 may be a central processing unit (CPU), a digital signal processor (DSP), or a processing unit in other form having data processing capability and/or program executing capability, such as a field programmable gate array (FPGA). For example, the CPU may be an X86 or ARM architecture or the like. The processor 210 may be a general-purpose processor or a dedicated processor and may control other components in the electronic device 20 to perform desired functions.

For example, the memory 220 may include any combination of one or more computer program products. The computer program products may include computer readable storage mediums in various forms, e.g., a volatile memory and/or a nonvolatile memory. The volatile memory may include, for example, a random access memory (RAM) and/or a cache, etc. The nonvolatile memory may include, for example, a read only memory (ROM), a hard disk, an erasable programmable read-only memory (EPROM), a compact disk read-only memory (CD-ROM), a USB memory, a flash memory, etc. One or more computer program modules 221 may be stored on the computer readable storage medium, and the processor 210 may run the one or more computer program modules 221 to realize various functions of the electronic device 20. Various applications and various kinds of data as well as various kinds of data used and/or generated by applications and the like may also be stored on the computer readable storage medium. The specific functions and the technical effects of the electronic device 20 may be known with reference to the above description regarding the instruction dispatching method 10, which will not be described here redundantly.

Figure 12:
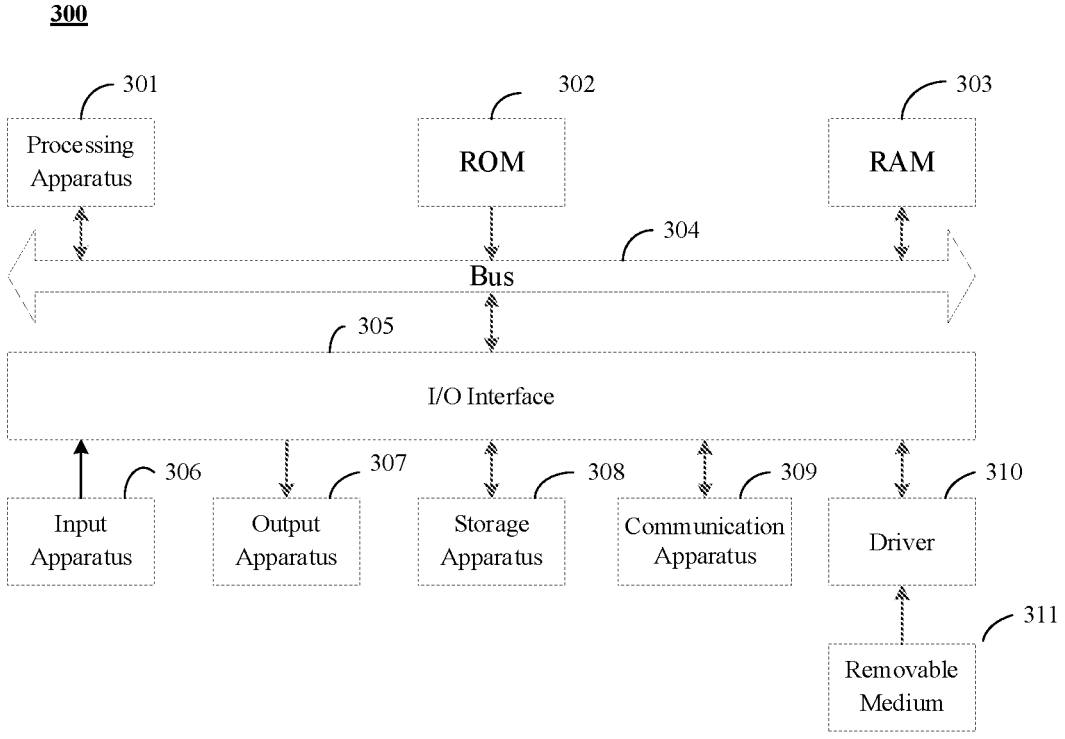
FIG. 12 is a schematic block diagram of another electronic device provided by at least one embodiment of the present disclosure.

FIG. 12 is a schematic block diagram of another electronic device provided by at least one embodiment of the present disclosure.

The electronic device 300 shown in FIG. 12 is merely an example, and should not pose any limitation to the functions and the range of use of the embodiments of the present disclosure. For example, as shown in FIG. 12, in some examples, the electronic device 300 includes a processing apparatus (e.g., a central processing unit, a graphics processing unit) 301, which can perform various suitable actions and processing according to a program stored in a read-only memory (ROM) 302 or a program loaded from a storage apparatus 308 into a random access memory (RAM) 303. The RAM 303 stores various programs and data required for operations of the computer system. The processing apparatus 301, the ROM 302, and the RAM 303 are interconnected by means of a bus 304. An input/output (I/O) interface 305 is also connected to the bus 304.

For example, the following components may be connected to the I/O interface 305: an input apparatus 306 including, for example, a touch screen, a touch pad, a keyboard, a mouse, a camera, a microphone, an accelerometer, and a gyroscope; an output apparatus 307 including, for example, a liquid crystal display (LCD), a loudspeaker, and a vibrator; a storage apparatus 308 including, for example, a magnetic tape and a hard disk; and a communication apparatus 309 including a network interface card such as a local area network (LAN) card and a modem. The communication apparatus 309 may allow the electronic device 300 to be in wireless or wired communication with other devices to exchange data, and the communication processing is performed via a network such as Internet. A driver 310 is also connected to the I/O interface 305 as required. A removable medium 311, such as a magnetic disk, an optical disc, a magneto-optical disc, a semiconductor memory, or the like, is installed on the driver 310 as required, so that a computer program read therefrom can be installed in the storage apparatus 308 as required. Although FIG. 12 illustrates the electronic device 300 having various apparatuses, it is to be understood that all the illustrated apparatuses are not necessarily implemented or included. More or less apparatuses may be implemented or included alternatively.

For example, the electronic device 300 may further include a peripheral interface (not shown in the figure) and the like. The peripheral interface may be an interface of any type, such as a USB interface and a lighting interface. The communication apparatus 309 may communicate with a network and other devices wirelessly. The network is, for example, Internet, an Intranet, and a wireless network, a wireless local area network (LAN) and/or a metropolitan area network (MAN) such as a cellular telephone network. Wireless communication may be any of a plurality of communication standards, protocols, and techniques, including but not limited to Global System for Mobile Communications (GSM), Enhanced Data Rate for GSM Evolution (EDGE), Wideband Code Division Multiple Access (WCDMA), Code Division Multiple Access (CDMA), Time Division Multiple Address (TDMA), Bluetooth, Wi-Fi (e.g., based on IEEE 802. 11a, IEEE 802. 11b, IEEE 802. 11g, and/or IEEE 802. 11n), Voice Over Internet Protocol (VOIP), Wi-MAX, protocols for E-mail, instant messaging, and/or short message service (SMS), or any other suitable communication protocol.

For example, the electronic device 300 may be any device such as a mobile phone, a Pad, a laptop, an E-book, a game machine, a television, a digital photo frame, and a navigator, and may also be any combination of a data processing apparatus and hardware, which will not be limited in the embodiments of the present disclosure.

For example, according to the embodiments of the present disclosure, the process described above with reference to the flowchart may be implemented as a computer software program. For example, an embodiment of the present disclosure includes a computer program product, which includes a computer program carried by a non-transitory computer-readable medium. The computer program includes a program code for performing the method shown in the flowchart. In such an embodiment, the computer program may be downloaded online through the communication apparatus 309 and installed, or installed from the storage apparatus 308, or installed from the ROM 302. When the computer program is executed by the processing apparatus 301, the instruction dispatching method 10 provided in the embodiments of the present disclosure is performed.

It should be noted that the computer readable medium described above in the present disclosure may be a computer readable signal medium or a computer readable storage medium or any combination thereof. For example, the computer-readable storage medium may be, but not limited to, an electric, magnetic, optical, electromagnetic, infrared, or semiconductor system, apparatus or device, or any combination of them. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In embodiments of the present disclosure, the computer-readable storage medium may be any tangible medium containing or storing a program that can be used by or in combination with an instruction execution system, apparatus or device. In embodiments of the present disclosure, the computer-readable signal medium may include a data signal that propagates in a baseband or as a part of a carrier and carries thereon a computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable storage medium may send, propagate or transmit a program used by or in combination with an instruction execution system, apparatus or device. The program code included on the computer-readable medium may be transmitted by using any suitable medium, including but not limited to an electric wire, a fiber-optic cable, radio frequency (RF) and the like, or any appropriate combination thereof.

The above-mentioned computer-readable medium may be included in the electronic device 300 described above, or may exist alone without being assembled with the electronic device 300.

Figure 13:
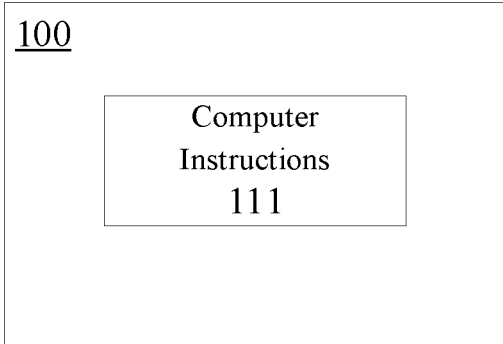
FIG. 13 is a schematic block diagram of a non-transient readable storage medium provided by at least one embodiment of the present disclosure.

FIG. 13 is a schematic block diagram of a non-transient readable storage medium provided by at least one embodiment of the present disclosure.

An embodiment of the present disclosure further provides a non-transient readable storage medium. FIG. 13 is a schematic block diagram of a non-transient readable storage medium according to at least one embodiment of the present disclosure. As shown in FIG. 13, computer instructions 111 are stored on the non-transient readable storage medium 100. When the computer instructions 111 are executed by a processor, one or more steps of the instruction dispatching method 10 described above is/are performed.

For example, the non-transient readable storage medium 100 may be any combination of one or more computer readable storage mediums. For example, one computer readable storage medium includes a computer-readable program code for receiving a plurality of thread instruction dispatching requests sent by a plurality of decoded instruction queues, respectively, and the other computer readable storage medium includes a computer-readable program code for determining whether the plurality of thread instruction dispatching requests have congestion and conflict with respect to the plurality of execution waiting queues. Another computer readable storage medium includes a computer-readable program code for selecting and responding to one thread instruction dispatching request from plurality of thread instruction dispatching requests based on the above determining. As a matter of course, the program codes described above may also be stored on a same computer-readable medium, which will not be limited in the embodiments of the present disclosure.

For example, when the program codes are read by a computer, the computer may execute the program codes stored on the computer storage medium to perform, for example, the instruction dispatching method 10 provided in any embodiment of the present disclosure.

For example, the storage medium may include a storage card of a smart phone, a memory component of a Pad, a hard disk of a personal computer, a random access memory (RAM), a read-only memory (ROM), an erasable programmable read-only memory (EPROM), a compact disk read-only memory (CD-ROM), a flash memory, or any combination of such storage mediums, and may also be other suitable storage medium. For example, the readable storage medium may also be the memory 220 in FIG. 11, and the related description may be shown in the above contents, which will not be described here redundantly.

In the present disclosure, the term "a plurality of" means two or more, unless otherwise defined.

A person skilled in the art can easily think of other implementation solutions of the present disclosure after considering the specification and practicing the content disclosed herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

It should be noted that, the present disclosure is not limited to the precise structures that have been described above and shown in the accompanying drawings, and can be modified and changed in many ways without departing from the scope of the present disclosure. The scope of the present disclosure is defined by the appended claims.

The invention claimed is:

1. An instruction dispatching method for a multithreaded processor, comprising:

receiving a plurality of thread instruction dispatching requests sent by a plurality of decoded instruction queues of the multithreaded processor, respectively, wherein each of the plurality of thread instruction dispatching requests comprises a plurality of instructions needing to be transmitted to execution waiting queues of corresponding types, respectively;

determining whether the plurality of thread instruction dispatching requests have congestion and conflict with respect to a plurality of execution waiting queues of the multithreaded processor; and selecting and responding to one thread instruction dispatching request from the plurality of thread instruction dispatching requests based on the determining, wherein the multithreaded processor comprises a plurality of threads, and wherein the plurality of execution waiting queues comprise at least one shared execution waiting queue shared by the plurality of threads and a plurality of independent execution waiting queues used for the plurality of threads, respectively.

2. The method according to claim 1, wherein the determining whether the plurality of thread instruction dispatching requests have congestion and conflict with respect to a plurality of execution waiting queues, comprises:

determining whether the plurality of thread instruction dispatching requests have congestion and conflict with respect to the plurality of execution waiting queues based on a number of tokens currently available for each of the plurality of execution waiting queues.

3. The method according to claim 2, wherein the determining whether the plurality of thread instruction dispatching requests have congestion with respect to the plurality of execution waiting queues based on a number of tokens currently available for each of the plurality of execution waiting queues, comprises:

in response to a number of tokens in a first execution waiting queue of the plurality of execution waiting queues required by a first thread instruction dispatching request of the plurality of thread instruction dispatching requests being greater than a number of tokens currently available in the first execution waiting queue, determining that the first thread instruction dispatching request has congestion with respect to the first execution waiting queue.

4. The method according to claim 2, wherein the determining whether the plurality of thread instruction dispatching requests have conflict with respect to the plurality of execution waiting queues based on a number of tokens currently available for each of the plurality of execution waiting queues, comprises:

in response to a second thread instruction dispatching request of the plurality of thread instruction dispatching requests having congestion with respect to a second execution waiting queue of the at least one shared execution waiting queue and a number of tokens in the second execution waiting queue required by a third thread instruction dispatching request of the plurality of thread instruction dispatching requests being not greater than a number of tokens currently available in the second execution waiting queue, determining that the second thread instruction dispatching request and the third thread instruction dispatching request have conflict with respect to the second execution waiting queue.

5. The method according to claim 1, wherein the selecting and responding to one thread instruction dispatching request from the plurality of thread instruction dispatching requests based on the determining, comprises:

adding at least one of the plurality of thread instruction dispatching requests to a candidate request set based on the determining; and selecting and responding to one thread instruction dispatching request from the candidate request set based on priorities of the plurality of threads.

6. The method according to claim 5, wherein the adding at least one of the plurality of thread instruction dispatching requests to a candidate request set based on the determining, comprises:

in response to existence of a fourth thread instruction dispatching request having no congestion and no conflict with respect to the plurality of execution waiting queues among the plurality of thread instruction dispatching requests, adding the fourth thread instruction dispatching request to the candidate request set.

7. The method according to claim 6, wherein the adding at least one of the plurality of thread instruction dispatching requests to a candidate request set based on the determining, comprises:

in response to non-existence of the fourth thread instruction dispatching request among the plurality of thread instruction dispatching requests and existence of a fifth thread instruction dispatching request having conflict with respect to the plurality of execution waiting queues among the plurality of thread instruction dispatching requests, adding the fifth thread instruction dispatching request to the candidate request set.

8. The method according to claim 5, wherein the selecting one thread instruction dispatching request from the candidate request set based on priorities of the plurality of threads, comprises:

determining current priorities of the plurality of threads using a least recently used algorithm; and selecting a thread instruction dispatching request with a highest current priority from the candidate request set.

9. The method according to claim 8, wherein the determining current priorities of the plurality of threads using a least recently used algorithm, comprises:

initializing the priorities of the plurality of threads; and in response to selecting a first thread of the plurality of threads in a previous clock cycle, setting a priority of the first thread in a current clock cycle to a lowest priority and progressively increasing priorities of other threads than the first thread among the plurality of threads.

10. The method according to claim 5, wherein the selecting one thread instruction dispatching request from the candidate request set based on priorities of a plurality of threads, comprises:

determining the current priorities of the plurality of threads using a round-robin algorithm.

11. The method according to claim 1, wherein the multithreaded processor comprises at least 3 threads.

12. An electronic device, comprising:

a processor; and a memory, comprising one or more computer program modules, wherein the one or more computer program modules are stored in the memory and configured to be executed by the processor; and the one or more computer program modules comprise instructions for implementing the instruction dispatching method according to claim 1.

13. A non-transient readable storage medium, storing computer instructions, wherein the computer instructions, upon being executed by a processor, implement the instruction dispatching method according to claim 1.

14. An instruction dispatching apparatus, comprising:

a receiving unit, in communication connection with a multithreaded processor and configured to receive a plurality of thread instruction dispatching requests sent by a plurality of decoded instruction queues of the multithreaded processor, respectively, wherein each of the plurality of thread instruction dispatching requests comprises a plurality of instructions needing to be transmitted to execution waiting queues of corresponding types, respectively;

a determination unit, in communication connection with the multithreaded processor and configured to determine whether the plurality of thread instruction dispatching requests have congestion and conflict with respect to a plurality of execution waiting queues of the multithreaded processor; and a selection unit, configured to select and respond to one thread instruction dispatching request from the plurality of thread instruction dispatching requests based on a determination result of the determination unit, wherein the multithreaded processor comprises a plurality of threads, and wherein the plurality of execution waiting queues comprise at least one shared execution waiting queue shared by the plurality of threads and a plurality of independent execution waiting queues used for the plurality of threads, respectively.

15. The instruction dispatching apparatus according to claim 14, wherein the determination unit comprises a combination determination subunit, wherein the combination determination subunit is configured to determine whether the plurality of thread instruction dispatching requests have congestion and conflict with respect to the plurality of execution waiting queues based on a number of tokens currently available for each of the plurality of execution waiting queues.

16. The instruction dispatching apparatus according to claim 15, wherein the combination determination subunit comprises a congestion determination unit, wherein the congestion determination unit is configured to, in response to a number of tokens in a first execution waiting queue of the plurality of execution waiting queues required by a first thread instruction dispatching request of the plurality of thread instruction dispatching requests being greater than a number of tokens currently available in the first execution waiting queue, determine that the first thread instruction dispatching request has congestion with respect to the first execution waiting queue.

17. The instruction dispatching apparatus according to claim 15, and the combination determination subunit comprises a conflict determination unit, wherein the conflict determination unit is configured to, in response to a second thread instruction dispatching request of the plurality of thread instruction dispatching requests having congestion with respect to a second execution waiting queue of the at least one shared execution waiting queue and a number of tokens in the second execution waiting queue required by a third thread instruction dispatching request of the plurality of thread instruction dispatching requests being not greater than a number of tokens currently available in the second execution waiting queue, determine that the second thread instruction dispatching request and the third thread instruction dispatching request have conflict with respect to the second execution waiting queue.

18. The instruction dispatching apparatus according to claim 14, wherein the selection unit comprises a candidate selection unit and a priority selection unit, wherein the candidate selection unit is configured to add at least one of the plurality of thread instruction dispatching requests to a candidate request set based on the determination result of the determination unit; and the priority selection unit is configured to select and respond to one thread instruction dispatching request from the candidate request set based on priorities of the plurality of threads.

19. A data processing apparatus, comprising the instruction dispatching apparatus according to claim 14, a plurality of decoded instruction queues, and a plurality of execution waiting queues.

20. A processor, comprising the data processing apparatus according to claim 19.

* * * * *